United States Patent
Schaefer

[15] 3,673,397
[45] June 27, 1972

[54] CIRCUIT TESTER
[72] Inventor: Bruce M. Schaefer, Santa Clara, Calif.
[73] Assignee: The Singer Company, New York, N.Y.
[22] Filed: Oct. 2, 1970
[21] Appl. No.: 77,478

[52] U.S. Cl. ...........................235/153, 324/73 R, 324/73 PC
[51] Int. Cl. .......................................G06f 9/04, G06f 15/20
[58] Field of Search ......................324/73 R, 73 PC; 235/153

[56] References Cited

UNITED STATES PATENTS 3,370,232   2/1968   Wickersham ........................324/73 R

*Primary Examiner*—Eugene G. Botz
*Assistant Examiner*—R. Stephen Dildine, Jr.
*Attorney*—Francis L. Masselle and William Grobman

[57] ABSTRACT

The disclosed embodiment of the present invention is an automatic circuit tester for providing stimuli to, sensing responses from, and sensing the condition of individual input and output terminals of the circuit under test. Identical circuit means are provided for each input and output terminal of the circuit under test, and each includes a storage device for storing a prediction of the expected response of the stimulus to be applied to a corresponding input terminal of the circuit under test. Each of the circuit means also includes a logic circuit for comparing the prediction of the expected response and producing a "fail" signal upon the occurrence of non-coincidence therebetween. Each of the circuit means are automatically provided with data corresponding to the prediction of the expected response or the stimulus to be applied to the circuit under test from a programmable record such as a data processing card. In addition, each circuit means is capable of responding to or providing stimulus in the proper form to the corresponding terminal in accordance with the type of logic employed in the circuit under test. This is accomplished by employing translators for converting input and output signals to appropriate signals which are compatible with the type of logic employed in the circuit means and in the circuit under test. Each circuit means is programmed by programmable data processing cards and the information programmed on such cards is strobed by appropriate timing and encoding circuits into a corresponding one of the circuit means.

5 Claims, 4 Drawing Figures

| FIELD 1 LOGIC SEL | FIELD 2 MATRIX | FIELD 3 OUTPUT | FIELD 4 DATA | FIELD 5 DATA | FIELD 6 DATA | FIELD 7 DATA | FIELD 8 DATA |
|---|---|---|---|---|---|---|---|
| 12 | 11 | 11 | 11 | 11 | 11 | 11 | 11 |
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5 | 5 | 5 | 5 | 5 | 5 | 5 | 5 |
| 6 | 6 | 6 | 6 | 6 | 6 | 6 | 6 |
| 7 | 7 | 7 | 7 | 7 | 7 | 7 | 7 |
| 8 | 8 | 8 | 8 | 8 | 8 | 8 | 8 |
| 9 | 9 | 9 | 9 | 9 | 9 | 9 | 9 |
| 1 2 3 4 5 6 7 8 9 10 | 20 | 30 | 40 | 50 | 60 | 70 | 80 |

PROGRAM COLUMNS

FIG. 2

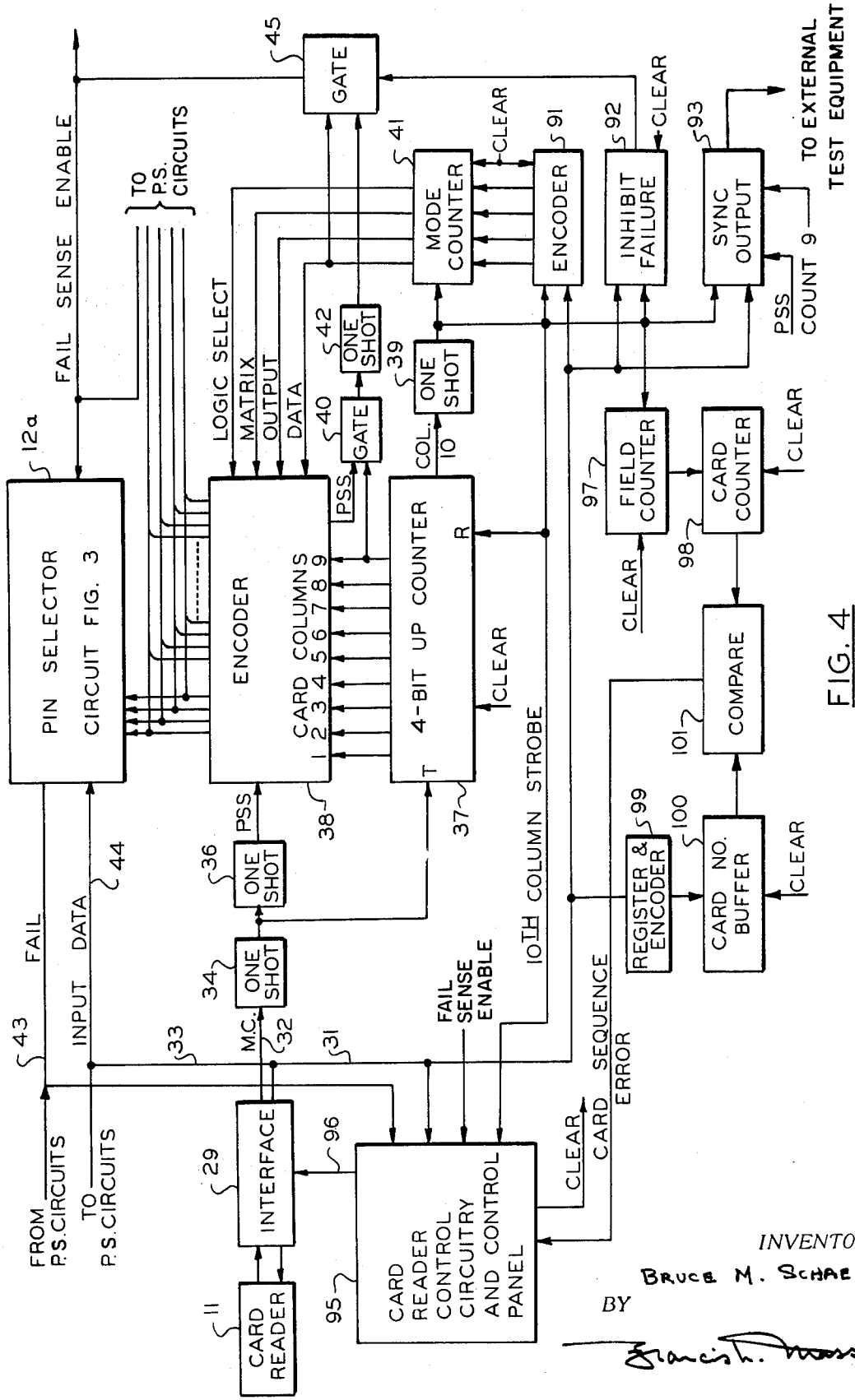

CIRCUIT TESTER

This invention relates generally to a circuit tester and more particularly to a tester for providing a stimuli to and receiving responses from individual input and output terminals, respectively, of a circuit under test and comparing the received responses with programmed predictions to provide an indication of proper functioning of the circuit.

In the past, it was the practice in the construction of various electronic systems and devices to visually inspect each printed circuit card to be employed therein and then to check or test that circuit in the complete system under actual operating conditions. The visual inspection consisted of observing the leads and components in an attempt to detect solder bridges between traces, open traces, components which have been omitted or improperly connected, and the like. Extensive visual inspection was performed in an attempt to detect or anticipate failures. Such extensive inspection resulted in increased expenses in the manufacture of such circuits. In addition, and after such visual inspection was performed, the circuits were tested individually by connecting them into the complete system and observing their performance. It was also necessary to observe the performance of such circuits by an operator employing measuring and indicating devices, such as voltmeters and oscilloscopes. If the circuit being tested did not perform to certain specifications, it was also necessary for a technician to trouble-shoot each circuit in accordance with standard trouble-shooting techniques. This form of circuit testing also added considerably to the expense of producing such circuits.

In an effort to reduce the expense of testing and trouble-shooting individual circuits, various types of automatic and semi-automatic circuit testers were developed. One type of tester employed in the past consisted of a large number of switches connected to a patch panel. The individual input and output terminals of the circuit under test were connected to the patch panel and the switches were employed to connect such terminals to either power supplies to provide stimuli thereto or to indicators to observe the response therefrom.

In such a tester, unless a large number of components were employed, i.e., switches, power supplies and indicators, only a limited number of terminals of the circuit under test could be tested in any given time. If a large number of such components were employed, the setup of the tester by an operator was complicated and usually lead to confusion. That is, the use of a patch panel and patch cords or wires to connect the various input and output terminals, the switches, power supplies and indicators could lead to confusion if a large number of terminals had to be tested simultaneously. Furthermore, any one misconnection would destroy the reliability of the results obtained from such testing.

In addition, testers employed in the past were not capable of testing circuits of differing types of logic without additional structure or patching of additional power supplies to the circuit under test. In addition, such testers were programmed by the use of patch panels and patch cords or wires which reduced the reliability of the test results. Attempts have been made to program the testers by use of punched paper tape or coded magnetic tape. However, such programming mediums do not provide the versatility and ease of programming required of such testers.

Accordingly, it is an object of the present invention to provide a circuit tester which can automatically provide stimuli to and receive responses from individual input and output terminals of the circuit under test and compare such responses with programmed predictions to indicate proper functioning of the circuit.

Another object of the present invention is to provide a circuit tester which can simultaneously control the inputs to and observe the outputs from a large number of input and output terminals of a circuit under test.

Still another object of the present invention is to provide a circuit tester which does not employ a large number of mechanical components and which requires no patching to perform a majority of the test functions required.

A feature of the present invention resides in the provision of an output circuit for the "fail" indication which will indicate a failure if the sensing circuit is not connected to the corresponding input or output terminal of the circuit under test. Another feature of the present invention resides in the provision of circuit means for providing an indication of the data stored for each terminal of the circuit under test, either as a stimulus or as a predicted response, whenever "fail" is indicated from the test of any one terminal.

Still another feature of the present invention resides in the capability of the tester of the present invention to test any type of logic, such as emitter coupled logic or saturated logic.

Another feature of the present invention resides in its capability to ascertain certain conditions of a corresponding terminal of the circuit under test when a stimulus is provided thereto. A further feature of the present invention resides in its ability to select any terminal of the circuit under test as either an input or an output terminal to provide an stimulus thereto or receive a response therefrom, respectively. In addition, the present invention is capable of connecting any terminal of the circuit under test to a patch panel for extraordinary testing.

A further feature of the present invention is that a programmable card reader controls the entire operation of the tester and permits manual control thereover by controlling the card reader.

Still a further feature of the present invention is that the logic circuitry employed is of the same type as the logic circuitry employed in the circuit under test or translators for converting signals of one logic type to signals compatible with another logic type are employed.

In addition to the advantages which are apparent from the above, the present invention provides the advantage of automatically sequencing through all of the programmed test conditions without interruption, but ceases its operation immediately upon the occurrence of a failure. In addition, the present invention is capable of simultaneously testing all input and output terminals on a circuit. Additionally, the present invention is capable of testing circuits employing different types of logic.

These and other objects, features and advantages of the present invention will be more fully realized and understood in the following detailed description, wherein:

FIG. 2 is a diagram of a data processing card and an illustration of the organization of data programmed thereon;

FIG. 4 is a block diagram of the timing and control circuit illustrated in FIG. 1.

Figure 1:
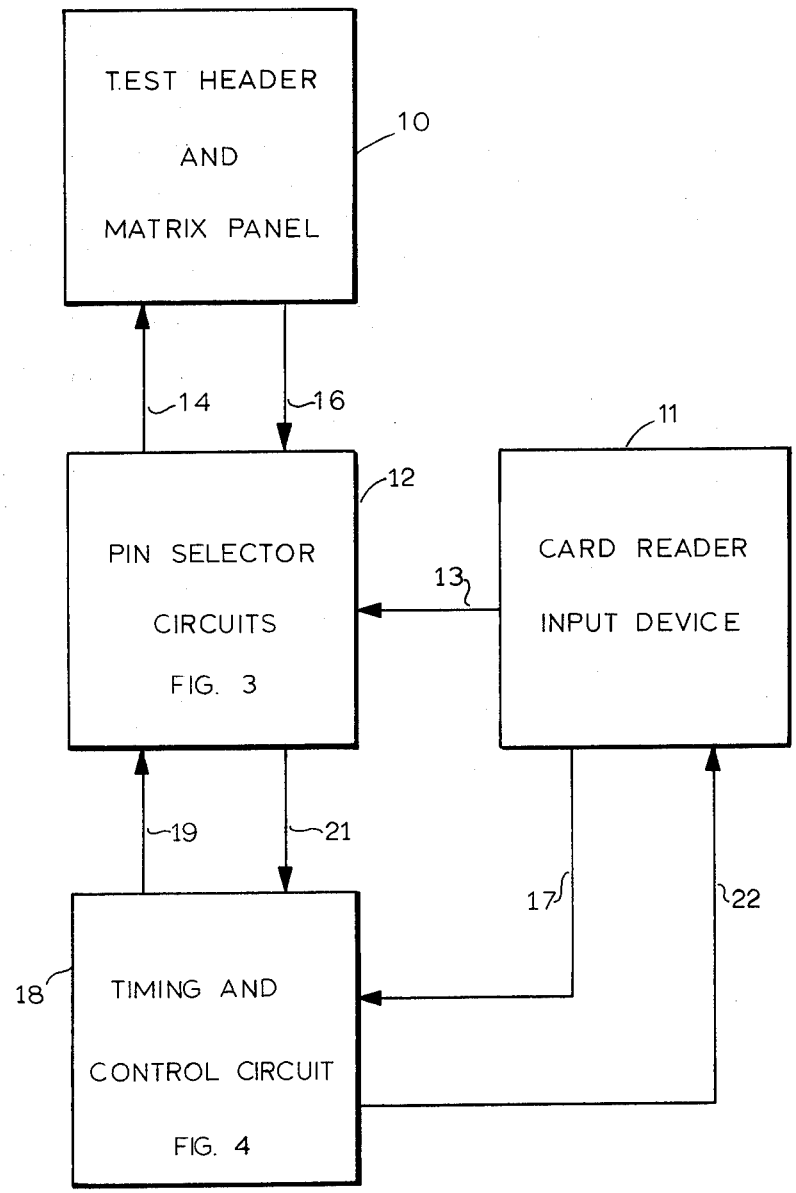
FIG. 1 is a general block diagram of a tester constructed in accordance with the principles of the present invention and illustrates the flow of data and control signals.

With particular reference to FIG. 1, there is shown a test header and matrix panel designated with the reference numeral 10, the test header of which is adapted for receiving the input and output terminals of the circuit under test. A card reader 11 supplies test data in the form of stimuli and predicted responses to a plurality of pin selector circuits 12 as represented by the line 13 therebetween. The pin selector circuits supply all of the programmed stimuli to the circuit under test as represented by the line 14 and receives responses from the circuit under test by means represented by a line 16. In addition, the card reader supplies additional data to the pin selector circuits on the line 13 in the form of logic select signals and matrix select signals, which signals will be explained in greater detail hereinbelow. The card reader 11 also supplies data by means represented by the line 17 to a timing and control circuit 18. A portion of such data is encoded and supplied to the pin selector circuits 12 by means represented by a line 19, which encoded information is employed for strobing data from the card reader 11 into the pin selector circuits 12. If the pin selector circuits 12 detect an erroneous output or condition from the circuit under test, a fail signal is provided on a line 21 to the timing and control circuit 18 to stop the operation of the card reader 11 via a line 22 to discontinue further processing of the input and output data.

FIG. 2 illustrates the organization of data on a data processing tab card wherein the various locations are divided into fields which are separated by program columns. Each tab card contains 80 columns and 12 rows of individual locations for receiving a punched hole therein. Each field includes at least nine columns and ten rows. Each location within a field corresponds to one terminal of the circuit under test and, therefore, the number of locations in each field can be increased or decreased accordingly. Appropriate programming of the program columns will alter the type of data contained in the field following such a column or will provide certain control functions. All of these functions and results will be explained in greater detail hereinbelow.

FIG. 2 illustrates a typical example of the organization of data on the tab card, wherein no special functions are programmed into the program columns. The first field of the tab card, the logic select field, allows the programmer the ability to select between one of two separate logic voltage levels for each terminal of the circuit under test. It is to be understood, of course, that the invention is not limited to the testing of only two types of logic circuits. The second field of the tab card, the matrix field, allows the programmer to select any terminal of the circuit under test for external connection through the matrix panel 10. The third field of the tab card, the output field, is employed to designate the terminal of the circuit under test as being either an input terminal or an output terminal. The fourth and successive fields of the tab card, the input test data fields, are employed for providing a stimulus to or indicating a predicted response from the corresponding terminal of the circuit under test. Accordingly, the data entered into the output field of the tab card and the data entered into the data fields of the tab card are related to one another, since a stimulus is always provided to an input terminal of the circuit under test and a prediction of the expected response is entered into the data field for an output terminal of the circuit under test. This sequence of fields on the tab card will occur automatically unless an appropriate punch is entered into one of the program columns preceeding such a field. If a second card is employed, and no special functions are programmed in the program columns, all of the fields thereon will also contain input test data.

Figure 3:
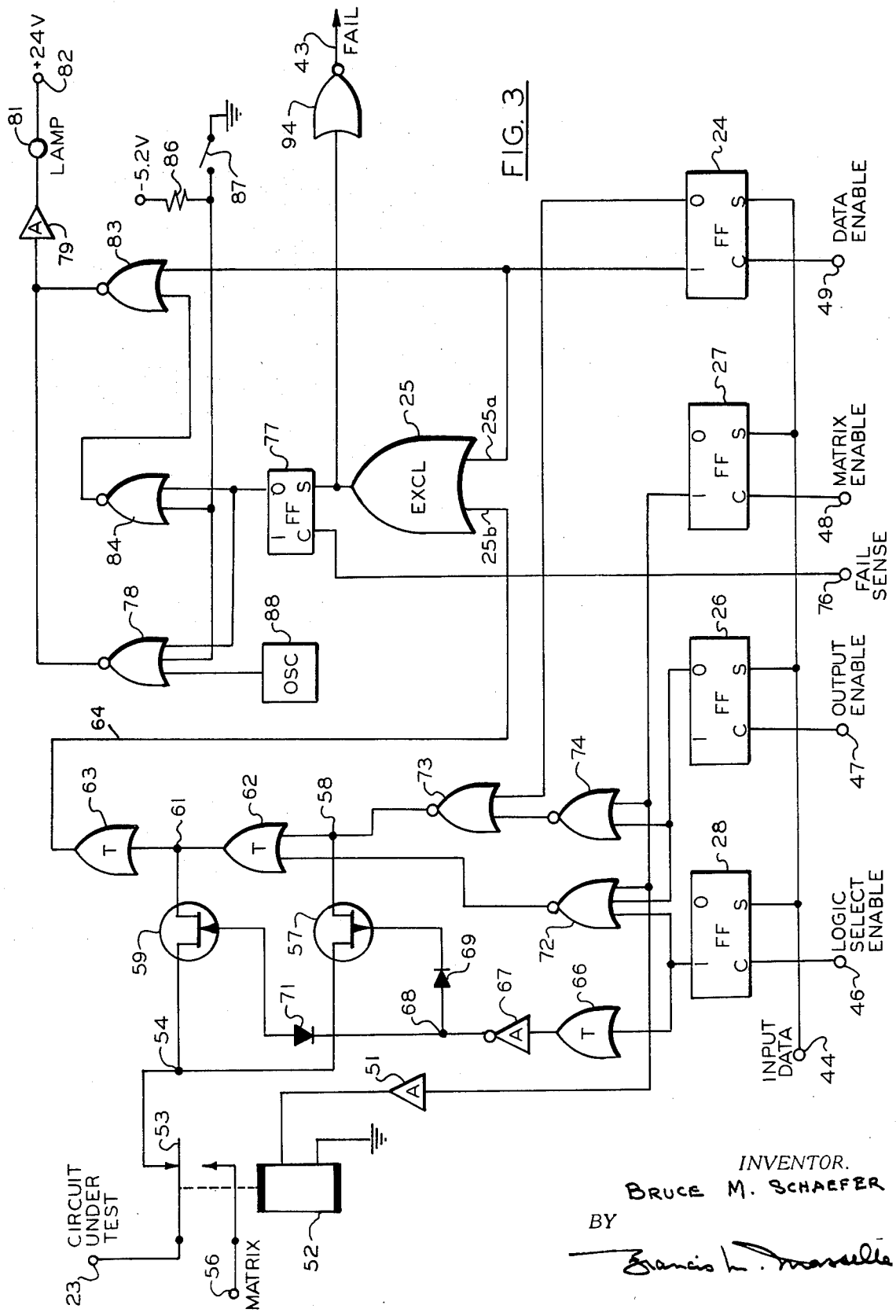
FIG. 3 is a schematic diagram of one of the pin selector circuits illustrated in FIGS. 1 and 4.

FIG. 3 is a schematic and logic diagram of one of the pin selector circuits illustrated in FIGS. 1 and 4. One pin selector circuit is employed for each terminal of the circuit under test. Therefore, each location within a field on a tab card corresponds to a respective one of the pin selector circuits. The test header consists of a connector, such as a printed circuit connector, for receiving the terminals at one end of a printed circuit card. Each terminal of that connector is, in turn, connected to a terminal 23 of each pin selector circuit. A flip-flop 24 is disposed for receiving input test data from the data fields of the tab card in the form of a stimulus or in the form of a predicted response for each terminal of the circuit under test. A flip-flop 26 is provided for storing data which dictates the form of the data stored in the flip-flop 24. That is, the flip-flop 26 will be supplied with the data from the output field of the tab card which indicates whether the data stored in the flip-flop 24 is a stimulus to an input terminal of the circuit under test or a prediction of the response expected from the output terminal of the circuit under test. More precisely, the data stored in the flip-flop 26 defines the terminal of the circuit under test which is connected to the terminal 23 as being either an input terminal or an output terminal. A flip-flop 27 is provided for storing the matrix data and is operative to connect the terminal of the circuit under test to the corresponding pin selector circuit for conventional testing or to the matrix panel for extraordinary testing thereof. A flip-flop 28 is provided for storing the data from the logic select field of the tab card corresponding to the type of logic employed in the circuit under test. The functions of each of these flip-flops and the manner of entering data therein will become apparent in the following description. However, it should be noted that the data entered into each of the flip-flops 24, 26, 27 and 28 correspond to and is derived from the data punched into the respective fields on the tab card illustrated in FIG. 2. All of this data is supplied to the pin selector circuit from the card reader as indicated in FIG. 1 by the line 13.

For a fuller understanding of the manner in which data is entered into the pin selector circuit 12, and the manner in which the data contained on the tab card controls the function of the tester, reference is made to FIG. 4 of the drawings. As shown therein, data derived from the tab card in the card reader 11 is supplied to an interface 29 which converts the voltage output levels thereof to appropriate logic levels. Since the card reader 11 reads 12 rows of data simultaneously (with columns being read successively), and also contains a clock synchronized with the sensing of each column, the output of the card reader 11 consists of 12 lines containing data and one line containing clock pulses. The 12 lines containing data are designated with the reference numeral 31 and the line containing clock pulses is designated with the reference numeral 32. Ten of the 12 lines containing data are connected to respective pin selector circuits as represented by the line designated with the reference numeral 33. The lines 33 transmit the data contained in the rows designated 0–9 in FIG. 2. The pin selector circuits which receive data from the same row on the tab card are connected to the same one of the lines 33. Accordingly, in the exemplification of the present invention, each one of the lines 33 is connected to nine pin selector circuits. Clock pulses from the interface 29 are supplied to a leading edge one-shot 34 to provide a pulse occurring at the leading edge of the clock pulses, but of relatively short time duration in relation to the time duration of the clock pulse. The output of the one-shot 34 is supplied to a trailing edge one-shot 36 and to the input of a counter 37. The one-shot 36 produces a pulse upon the occurrence of the trailing edge of the pulse supplied by the one-shot 34 and supplies this pulse to an encoder 38. Accordingly, the pulse produced by the one-shot 36 is delayed in time from the leading edge of the clock pulse produced by the card reader 11 and is of relatively short time duration in relation to the length of the clock pulse. Also, the pulse produced by the one-shot 36 will follow the pulse provided by the one-shot 34. The output of the one-shot 36 is employed for strobing information from the encoder 38 to the pin selector circuits 12.

The counter 37 is responsive to the pulse produced by the one-shot 34 to count through a sequence from 1–9, which count corresponds to the number of columns in a field on the tab card illustrated in FIG. 2. Accordingly, during the time that the first column in a field is being read, the first output line of the counter is energized; during the time that the second column in a field is being read, the second output line is energized; and so on for each of the output lines of the counter 37. The tenth and final count in a sequence of counts from the counter 37 is supplied to a one-shot 39 which produces a pulse in response thereto for sequencing a mode counter 41 through successive modes corresponding to the fields on a tab card. As shown in FIG. 4, the first output from the mode counter 41 corresponds to a logic select field of the tab card; the second output corresponds to the matrix field of the tab card; the third output corresponds to the output field of the tab card; and the fourth output corresponds to the data field of the tab card. Each of these outputs are supplied to the encoder 38 for selectively enabling a respective one of the pin selector circuits 12 to receive input data therein.

The encoder 38 provides 36 outputs arranged in nine groups with four outputs per group. Each group of outputs is enabled by a respective one of the outputs from the counter 37. The four outputs in each group correspond to the four modes from the output of the counter 41. Each group of outputs is connected to the ten pin selector circuits which do not share a common input data line from the interface 29. Accordingly, the input data on lines 33 is strobed into a first group of ten pin selector circuits when the first group of outputs of the encoder 38 are energized.

The ninth count from the counter 37, and the output of the one-shot 36 (through the encoder 38) are supplied through an AND gate 40 and a trailing edge one-shot 42 to one input of an AND gate 45. Another input to the gate 45 is derived from the "data" line at the output of the counter 41. If the third input to the gate 45 is high, a coincidence of a ninth count from the counter 37 and an output on the "data" line of the counter 41 will provide a "fail sense enable" output signal to all of the pin selector circuits 12. If a failure is detected, a "fail" signal is provided on an output line 43 from each of the pin selector circuits 12.

Input data on the lines 33 is supplied to each of the pin selector circuits on a terminal 44 thereof (see FIG. 3). The four outputs of the encoder in each group are supplied to input terminals 46, 47, 48 and 49, respectively, of each pin selector circuit. In considering a complete cycle of operation during reading of a tab card, the encoder 38 successively energizes its respective outputs to enable the pin selector circuits 12 to receive input data supplied thereto. When the card reader 11 is reading the data from the first column in the first field of the tab card, the first output of the "logic select" output of the first group of outputs from the encoder 38 will be energized. When the card reader 11 is reading the second column in the first field of the tab card, the first output of the "logic select" output of the second group of outputs of the encoder 38 will be energized. Accordingly, during reading of the first column in the first field of the tab card, ten of the pin selector circuits 12 will receive input data on their terminals 44 from respective ones of the lines 33. When the card reader 11 is reading the second column of the first field, the next ten pin selector circuits will be enabled to receive data from a respective one of the lines 33 on their terminals 44.

Since the first output of each group of outputs is connected to the terminal 46, the flip-flop 28 will be enabled to receive the input data applied to the terminal 44. However, the terminals 47, 48 and 49 will not be energized until a subsequent time and the flip-flops 24, 26 and 27 will not be enabled. The flip-flops 24, 26, 27 and 28 are single rail flip-flops which are enabled by a pulse supplied to the "C" or CLOCK input thereof to assume a state corresponding to the digital level of the voltage applied to the "S" or SET input thereof. That is, if the flip-flops are enabled and a "1" binary level is supplied to its respective input, the flip-flop will be set, and if a "0" is supplied to its respective terminal, it will be reset.

When the data stored in the flip-flop 24 corresponds to a prediction of the expected response from the terminal of the circuit under test, such data is supplied to one input terminal 25a of an exclusive OR gate 25 and the response from the terminal under test is supplied to the other input terminal 25b of exclusive OR gate 25. If the two signals are not of the same binary level, an output will be produced by the exclusive OR gate 25 to indicate a "fail" condition. An improper condition of the terminal under test can also be detected by the exclusive OR gate 25 and associated circuitry when a stimulus is applied to that terminal under test. The circuitry associated with the exclusive OR gate 25 and operative to supply the response from the terminal under test or its condition thereto will be explained in greater detail hereinbelow.

The "1" output of the flip-flop 27 is connected to a relay driver 51 which is, in turn, connected to a relay 52. The terminal of the circuit under test is connected through the terminal 23 to the movable contact arm 53 of the relay 52. When the flip-flop 27 is reset, an "0" level appears at its "1" output, thereby de-energizing the relay 52 and connecting the terminal 23 to a circuit point 54 through the contacts of the relay 52. However, when the flip-flop 27 is set, a "1" level will appear at its "1" output to energize the relay 52 and connect the terminal 23 to a terminal 56 through the contacts of the relay 52. Each terminal 56 of each pin selector circuit 12 is connected to a respective plug socket of the matrix panel 10. Accordingly, if a stimulus is to be applied to the terminal of the circuit under test or a response received therefrom and a prediction of that response is entered into the pin selector circuit, the flip-flop 27 is reset to connect the terminal of the circuit under test to the circuit point 54. If, however, some type of extraordinary testing is to be performed through a matrix panel 10, the flip-flop 27 is set to connect the terminal of the circuit under test to the terminal 56.

The circuit point 54 is connected through the source and drain electrodes of a field effect transistor (FET) 57 to a circuit point 58. In addition, the circuit point 54 is connected through a FET 59 to a circuit point 61. An OR gate translator 62 is connected between the circuit point 58 and the circuit point 61 and an OR gate translator 63 is connected between the circuit point 61 and a line 64. The gates 62 and 63, in addition to their OR function, translate the signals which are compatible with one logic type to signals which are compatible with another logic type. In the present exemplification of the present invention, the translator 62 is operative to convert from emitter coupled logic to saturated logic and the translator 63 is operative to convert from saturated logic to emitter coupled logic. These devices are well-known in the art and available as standard logic components.

The "1" output of the flip-flop 28 is connected through an OR gate translator 66 and a driver 67 to a circuit point 68. In the present exemplification, the flip-flops 24, 26, 27 and 28 are responsive and provide outputs which are compatible with emitter coupled logic. The translator 66 converts the emitter coupled logic compatible signal applied to its input to a signal compatible with saturated logic and applies such signal to a driver 67 having an inverted output. When the flip-flop 28 is reset, the driver 67 will provide a positive ten volts to the circuit point 68 and when the flip-flop 28 is set, it will provide a negative 15 volts to the circuit point 68. The circuit point 68 is connected through a diode 69 to the gate electrode of the FET 57 and through a diode 71 to the gate electrode of the FET 59. A positive voltage on the circuit point 68 will forward bias the diode 69 and block conduction through the FET 57 and will also back bias the diode 71 to permit conduction through the FET 59. A negative voltage applied to the circuit point 68 will forward bias the diode 71 and back bias the diode 69, thereby rendering the FET 57 conductive and the FET 59 non-conductive. Accordingly, if the terminal of the circuit under test provides a signal as an output therefrom or is responsive to a signal as an input thereto, which signals are compatible with emitter coupled logic, the flip-flop 28 is set to provide a conductive path through the FET 57 between the circuit points 54 and 58. However, if such signals are compatible with saturated logic, the flip-flop 28 is reset to provide a conductive path between the circuit points 54 and 61.

The "0" output of the flip-flop 26 is connected to one input of a NOR gate 72 and the "1" output of the flip-flop 28 is connected to another input thereof. These two inputs to the NOR gate 72 dictate that its output will always be a "1" whenever the terminal of the circuit under test is an output terminal and a response is to be received therefrom and the signal to be received is compatible with saturated logic. The output of the NOR gate 72 is supplied to a second input of the OR gate 62. In saturated logic, a zero level has precedence over a one level. When an output is compatible with saturated logic, a one level is supplied to the circuit point 61 from the NOR gate 72 and the gate 62. Accordingly, a zero level received through the FET 59 will override the one level from the gate 62 and supply a zero level through the gate 63 to the line 64. However, if a one level is supplied through the FET 59 to the circuit point 61, a one level will appear on the line 64.

As previously mentioned, data corresponding to a stimulus to be supplied to the terminal of the circuit under test or to a prediction of the expected response from the terminal of the circuit under test is stored in the flip-flop 24 as a discrete digital level. Such data is, accordingly, provided at the "1" output of the flip-flop 24 and the complement is provided in the "0" output of the flip-flop 24. The "0" output of the flip-flop 24 is connected to one input of a NOR gate 73 having its output connected to the circuit point 58. When the other input of the NOR gate 73 is at a "0" level, the NOR gate 73 will invert the signal level from the "0" output of the flip-flop 24 and supply it to the circuit point 58. If the terminal under test is to receive a stimulus, the "0" output of the flip-flop 26 is at a "1" level. The "0" output of the flip-flop 26 is connected to one input of a NOR gate 74, which is in turn connected at its output to the second input of the NOR gate 73. Accordingly, whenever the terminal of the circuit under test is to receive a stimulus, the output of the NOR gate 74 is at a "0" level and the data stored in the flip-flop 24 is supplied to the circuit point 58. When the "0" output of the flip-flop 26 is at a "1" level, the output of the NOR gate 72 is at a "0" level and the data applied to the circuit point 58 is thereby transferred to the circuit point 61. When the "1" output of the flip-flop 28 is at a "0" level, the FET 59 is conductive to apply the data at the circuit point 61 to the terminal of the circuit under test. Furthermore, and unless an improper condition appears on the terminal of the circuit under test, the data at the circuit point 61 will be transferred to the line 64 through the gate 63. However, since a "0" level in saturated logic has precedence over a "1" level, a condition of the terminal of the circuit under test which would provide a "0" level to the circuit point 61 through the FET 59 would provide a "0" level on the line 64. The consequence of this improper condition of the terminal under test will become more apparent in the following description. Such a condition of the terminal under test would occur, for example, by a short thereon to ground and would only have significance when the data supplied to the circuit point 61 is at a "1" level. When the "1" output of the flip-flop 28 is at a "1" level, the FET 57 will be rendered conductive and the FET 59 will be rendered non-conductive. If the terminal under test is an output terminal and provides a response, the "0" output of the flip-flop 26 produces a "0" level at the circuit point 58 from the gate 73. In emitter coupled logic, a "1" level has precedence over a "0" level. Therefore, when the response from the terminal under test is at a "0" level, it will be applied through the gates 62 and 63 to the line 64. However, when the response from the terminal under test is at a "1" level, it will override the "0" level from the gate 73 and will be applied through the gates 62 and 63 to the line 64.

If the terminal under test is an input terminal and a stimulus is to be provided thereto, the "0" output from the flip-flop 26 is at a "1" level, thereby applying the data stored in the flip-flop 24 to the circuit point 58 through the NOR gate 73. With the FET 57 conductive, such data will be connected to the terminal of the circuit under test. Since a "1" level has precedence over a "0" level, a "1" level on the terminal under test when a stimulus of a "0" level is being applied thereto, will develop a "1" level on the line 64. rather than a "0" level if such condition did not exist.

From the foregoing, it will be appreciated that responses from the terminal of the circuit under test are supplied to the line 64 as a signal which is compatible with emitter coupled logic regardless of the type of logic employed in the circuit under test. In addition, it will be appreciated that a stimulus can be provided to the terminal of the circuit under test, which stimulus will be compatible with the type of logic employed therein. It will also be appreciated that certain conditions of the terminal under test will provide a signal on the line 64 and to the input 25b of the exclusive OR gate 25 which will not coincide with the inputs applied to the input terminal 25a thereof.

As mentioned hereinabove in connection with the description of FIG. 4, a "fail sense enable" signal is supplied to the pin selector circuits 12 upon the occurrence of a count of nine in the counter 37 and when the counter 41 is in the data mode. This signal is supplied to a terminal 76 which is, in turn, connected to the clock input of a flip-flop 77. The output of the exclusive OR gate 25 is connected to the SET input of the flip-flop 77. Accordingly, if the inputs to the exclusive OR gate 25 are not of the same digital level, a "1" level will be produced at its output and supplied to the flip-flop 77. Such a "1" input to the flip-flop 77 will set the flip-flop. Otherwise, the flip-flop 77 will remain reset. The "0" output of the flip-flop 77 is connected to one input of a NOR gate 78. The output of the driver 79 is connected through an indicator lamp 81 to a source of positive voltage on a terminal 82. When the output of the lamp driver 79 is reduced to a "0" level in response to a "0" level at the input thereof, the lamp 81 will illuminate, thereby indicating a failure. This condition is produced when the flip-flop 77 is reset and its "0" output goes to a "1" level if there is no other influence on the input to the lamp driver 79. However, the "1" output of the flip-flop 24 is connected to an input of a NOR gate 83 having its output connected to the input of the driver 79. In addition, the "0" output of the flip-flop 77 is connected to an input of a NOR gate 84 having its output connected to a second input of the NOR gate 83. Therefore, when the "0" output of the flip-flop 77 is at a "1" level to provide a "0" level at the input of the driver 79, the output of the gate 84 will be at a "0" level and the level at the "1" output of the flip-flop 24 will be complemented by the NOR gate 83 and applied to the input of the driver 79. Since a "1" level in emitter coupled logic has precedence over a zero level, the lamp 81 will indicate the level of the data stored in the flip-flop 24. That is, when the "0" output of the flip-flop 77 is at a "1" level, one input to the gate 83 will be at a "0" level and the other input will be at the level of the "1" output of the flip-flop 24. If the "1" output of the flip-flop 24 is at a "1" level, the output of the NOR gate will be at a "0" level, thereby energizing the lamp 81. However, if the "1" output of the flip-flop 24 is at a "0" level the output of the gate 83 will be at a "1" level, which "1" level has precedence over the "0" level from the gate 78, thereby de-energizing the lamp 81.

If a failure is sensed by the exclusive OR gate 25, the "0" output of the flip-flop 77 will be at a "0" level. A negative voltage is connected through a resistor 86 to a second input of the gate 84 and a second input of the gate 78. In addition, a normally open switch 87 is connected between ground and those same inputs of the gates 84 and 78. An oscillator 88 is connected to a third input of the gate 78. The negative voltage supplied through the resistor 86 represents a "0" level on the corresponding input terminal of the gate 78. When the "0" output of the flip-flop 77 is at a "0" level, the oscillator 88 output will be effectively inverted through the gate 78 and applied to the lamp driver 79. This oscillatory signal will cause the lamp 88 to be successively energized and de-energized. Such blinking by the lamp 81 indicates the failure detected by the exclusive OR gate 25. The oscillatory signal applied to the driver 79 is not effected by the output of the gate 83, since that gate is effectively blocked and produces a "0" level at its output. The gate 83 is blocked by an application of a "1" level to the respective input thereof from the output of the gate 84. A "1" level output is provided by the gate 84 in response to a "0" level applied to both of its inputs.

If it is desired to determine the condition of the flip-flop 24 when a failure has been sensed, the switch 87 is closed to connect ground potential to the respective input of the gate 84. Such connection of ground level corresponds to a "1" logic level, thereby rendering the output of the gate 84 at a "0" level. In addition, a "1" level is applied to the respective input of the gate 78 by closure of the switch 87, thereby maintaining the output of the gate 78 at a "0" level and blocking the conduction of the oscillatory signal therethrough. The condition of the "1" output of the flip-flop 24, therefore, is applied through the gate 83 to the lamp driver 79 to control the illumination of the lamp accordingly.

In the description of the tab card illustrated in FIG. 2, it was mentioned that special functions could be programmed in the program columns. As also mentioned, if no such special functions were programmed therein, the data would be entered into the pin selector circuits in the sequence described hereinabove. The following is an example of the type of data and the respective row in which such data is entered in the program columns on the tab card.

| | |
|---|---|
| 11 | DATA |
| 0 | MATRIX |
| 1 | INHIBIT FAILURE |
| 2 | PASS |

| | |
|---|---|
| 3 | EXTRA |
| 4 | LOGIC SELECT |
| 5 | OUTPUT |
| 6 | PROGRAMMED STOP |
| 7 | SYNC 1 |
| 8 | SYNC 10 |
| 9 | EXTRA |

Accordingly, if it is desired to depart from the established arrangement of fields or to perform special functions, the appropriate row in each program column is punched. The mode counter 41 will, unless a departure is programmed into the program columns, follow the sequence of modes logic select, matrix, output, and data, and will remain in data until a signal is applied thereto to clear its contents. By placing a punched hole in one of the rows 0, 4, 5 or 11, the field following that program column will provide the corresponding data. This is accomplished by connecting four of the lines 31 which correspond to rows 0, 4, 5 and 11 to an encoder 91. In addition, the output of the one-shot 39 is supplied to the counter 41, such that on a count of ten, which corresponds with the reading of the program columns, the mode counter 41 is preset by the encoder 91 to the mode dictated by the data contained in that program column. If a program punch is not provided in the next succeeding program column, the mode counter 41 will continue to count through the modes as described hereinabove until it reaches the data mode. However, it can be readily appreciated from the foregoing, the mode counter 41 can be preset to the data mode by placing a punch in the eleventh row of the program column preceeding the field which is to contain the input test data. If the operator or programmer knows that a failure will occur at the completion of reading one particular field, but desired to continue into the next field, the one row of the program column preceeding the field in which the failure will occur is punched. This "inhibit failure" data is supplied on one of the lines 31 to an inhibit failure circuit 92. In addition, the output of the one-shot corresponding to the tenth count of the counter 37 is supplied to the circuit 92. The circuit 92 includes an AND gate and a flip-flop with the output of the AND gate connected to the set and reset output of the flip-flop representing an output of the circuit to the gate 45. In addition, the CLEAR line signal supplied to the inhibit failure circuit is connected to the reset input of the flip-flop. As previously mentioned, the output of circuit 92 is at a high level to permit the gate 45 to develop a fail sense enable. Upon the application of an input signal to both of the inputs of the circuit 92, its output will be reduced to a "0" level to the gate 45.

If it is desired to develop external sync pulses for connection to external test equipment, appropriate input signals are provided to the sync output encoder 93. A pulse is provided for each column in a particular field when the seventh row of the program column preceeding that field is provided with a punched hole. One input to the encoder 93 is the output of the one-shot 39 and another input is one of the lines 31 corresponding to the seventh row of data. The output of the one-shot 36 is also connected to the encoder 93 and is gated to its output when a signal is provided from the one-shot 39 and from the seventh row line of the lines 31. In addition, the count of nine output from the counter 37 is connected as an input to the encoder 93. When the eighth row corresponding to the sync 10 contains a punched hole, one pulse is provided at the output of the encoder 93 in the field following the program column containing that data. Accordingly, the line corresponding to the eighth row is connected to the encoder 93.

As previously mentioned, a signal is provided on the line 43 whenever a "fail" is detected. The fail signal is developed on the line 43 from the output of the exclusive OR gate 25 in FIG. 3. The output of the gate 25 is connected through a NOR gate 94 to invert the output thereof, such that the fail line is high when there is no failure being indicated and is low when a failure exists. This provides a fail safe feature, since the absence of a particular pin selector circuit will provide a low signal on the line 43, thereby indicating a failure. The line 43 is connected to a card reader control circuit 95 which is operative through a line 96 to the interface 29 to stop further processing of a tab card by the card reader 11.

A punched hole is always provided in row two of the program column following the last field containing data. This information is provided on the lines 31 to the card reader control circuit 95 to clear the card reader and to provide the CLEAR signal shown throughout FIG. 4.

If it is desired to stop the card reader at the end of a particular field, a punched hole is provided in row six in the program column preceeding that field. This data is provided on the lines 31 to the card reader control circuit 95 and in cooperation with the tenth column strobe is operative to stop further processing of the tab card by the card reader 11.

The tenth column strobe is also connected to a field counter 97 which supplies a count of the number of fields processed by the card reader 11 to a card counter 98. The eleventh row in the first field of the tab card contains the number of the card for a particular test. That is, if ten cards are employed in a particular test, the first card will contain a code which will provide a count of one of the line 31 corresponding to the 11th row. The code is contained in the first five columns and the line corresponding to row 11 is connected to a register and encoder 99 to provide a card count at its output. This card count is supplied to a card number buffer 100 and the output thereof is compared with the output of the card counter 98 in a comparison circuit 101. When a comparison does not exist, an output is provided to the card reader control circuit 95 to discontinue further processing of the tab card in the card reader 11.

It should be appreciated from the above, that various stimuli can be provided to a number of input terminals of a circuit under test and one or more responses would be expected from other terminals. Accordingly, the data corresponding to such stimuli and expected responses is entered into one data field to form one test for the circuit under test. Additional tests can be made in subsequent data fields, again providing stimuli to and receiving responses from the circuit under test. These subsequent tests can be organized such that the same logic select data, matrix data and output data pertain thereto by omitting a programmed punch in the program columns of the tab card. Otherwise, if these conditions are to change, appropriate punches are made in the program columns to enter in the change data and subsequently a program punch is entered to enter additional input test data. It can be readily appreciated that the tester of the present invention can provide a large number of tests in rapid successive order and can provide stimuli to and receive responses from all the terminals of the circuit under test during such rapid testing.

I claim:

1. A testing circuit having a terminal disposed for connection to a unit under test wherein a stimulus is supplied to the unit under test in response to one state of the testing circuit and receives a response from the unit under test in response to another state of the testing circuit, comprising:
   a. means for storing a signal in the form of one of two digital levels;
   b. programmable storage means having two states;
   c. a gate having one input connected to said signal storing means and another input connected to said storage means and an output disposed for connection to said terminal, whereby the output provides the stimulus to the unit under test; and
   d. comparing means having one input connected to said terminal and the output of said gate, and another input connected to said signal storing means and providing an output in response to non-coincidence between said signal and the response from the unit under test, whereby such output is an indication of a failure.

2. A system as defined in claim 1, further including means for converting a signal compatible with one logic type to a signal compatible with another logic type, said converting means being disposed for connection to said terminal.

3. A system as defined in claim 2, wherein said converting means includes a controllable conduction element having a conductive path in two directions therethrough.

4. A system as defined in claim 2, wherein said converting means includes a pair of controllable conduction elements connected in parallel with one another and each having a conductive path in two directions therethrough, said system further comprising programmable means for selectively enabling one of said controllable conduction elements.

5. A system for testing a digital circuit having a plurality of input and output terminals wherein the system provides stimuli to the input terminals and receives responses from the output terminals of the digital circuit in the form of two digital levels, comprising:

a. a plurality of circuit means each disposed for connection to a respective terminal of such a digital circuit, each of said circuit means including,
   1. means for storing a signal in the form of one of two digital levels;
   2. programmable storage means having two states;
   3. a gate having one input connected to said signal storing means and another input connected to said storage means and an output disposed for connection to said terminal, whereby the output provides the stimulus to the input terminal of the digital circuit; and
   4. comparing means having one input connected to one of said terminals and the output of said gate, and another input connected to said signal storing means and providing an output in response to non-coincidence between said signal and the response from the output terminal of the digital circuit, whereby such output is an indication of a failure;

b. means for reading a programmed record to provide data corresponding to the information contained thereon; and c. means responsive to said reading means for selectively energizing each of said circuit means.

* * * * *